Patented May 26, 1953

2,640,054

UNITED STATES PATENT OFFICE 2,640,054

PROCESS OF CRYSTALLIZING DIHYDRO-STREPTOMYCIN SULFATE

Robert B. Peet, Branford, Conn., assignor to Heyden Chemical Corporation, New York, N. Y., a corporation of Delaware No Drawing. Application August 10, 1949,
Serial No. 109,617

3 Claims. (Cl. 260—210)

My invention relates particularly to a method of purifying dihydrostreptomycin, as for instance by crystallization thereof.

Streptomycin is a well known antibiotic, the constitution of which is not completely known. However, it is known to be of a basic character and believed to contain at least two guanidine groups, one amino group and an aldehyde group.

Dihydrostreptomycin is a product formed by the hydrogenation of streptomycin whereby it appears that the carbonyl group of the streptose moiety of the molecule is reduced to the corresponding alcohol.

Usually an acid salt of streptomycin such as streptomycin sulfate is hydrogenated. The dihydrostreptomycin may be made or obtained in any desired way, but, for example, in accordance with any of the available or known procedures for that purpose, with the aid of a catalyst, such as one of the precious metals, or a compound thereof, and which may be on a carrier material, such as charcoal or alumina, if desired.

One example of obtaining the same in accordance with such a procedure may be as follows:

A solution containing 30.7 grams of streptomycin sulfate at a purity of 750 mcg./mg. in water and a concentration of approximately 250,000 mcg./ml. is agitated in a hydrogenation apparatus at a hydrogen pressure of 10 lbs./in.$^2$ for 25 hours at 22–25° C. in the presence of 236 mg. of platinum oxide as a catalyst. A quantitative recovery is effected of dihydrostreptomycin sulfate containing 0.5% of unreduced streptomycin sulfate. The dihydrostreptomycin sulfate shows a purity of 755 mcg./mg.

An object of my invention is to provide an effective method of purifying the said dihydrostreptomycin by crystallization.

I have discovered that dihydrostreptomycin, for example dihydrostreptomycin sulfate, can be crystallized from a ternary system of methanol and water and the salt dihydrostreptomycin sulfate, so as to obtain the crystals thereof with a high degree of purity, and freed effectively from undesirable extraneous materials.

In accordance with this process, a two phase system may be created in which a lower aqueous phase contains most of the dihydrostreptomycin, and in which lower layer the crystallization of the dihydrostreptomycin is carried out until it is complete, whereupon the methanol and water again become completely miscible.

While my invention may be carried out in many different ways, for the purpose of illustration I have described only certain examples thereof.

Generally, in carrying out my process, when about 15 grams, or 15%, of dihydrostreptomycin, for instance the sulfate thereof, is present in a mixture of about 50 ml. each of methanol and water, a lower aqueous layer thereof will contain most of the salt, and when seeded the dihydrostreptomycin sulfate will continue to crystallize therefrom until the crystallization is complete. While the respective amounts of methanol and water may be varied, preferably the amount of the methanol should not be less than 45% nor more than 60% by volume of the liquid, although the optimum alcohol concentration is 50%. Also, the process may be conducted at about room temperatures, but better results are obtained at 50° C.

For example, in accordance with my invention I may proceed as in the following examples, the proportions being by weight unless otherwise stated:

1. One kilogram of amorphous dihydrostreptomycin sulfate having a purity of about 700 mcg. per mg., is dissolved in 3333 ml. of water. To this is added an equal volume of methanol, containing any desired amount of seed crystals in suspension or admixture therewith. The mixture is allowed to stand undisturbed for about 24 hours at room temperature. At the end of this period, three 3333 ml. portions each of methanol are added at one hour intervals in order to stepwise increase the concentration of methanol to 80%. An hour after the last methanol addition, the crystals are filtered off and washed thoroughly, first with methanol, then with acetone. The substance is then dried in a vacuum oven at 50° C.

2. The crystallization is carried out in the same manner as in Example 1, except that the temperature is maintained at 50° C. It is found that this elevated temperature cuts down the said 24-hour period to three hours or less.

While I have described my invention above in detail I wish it to be understood that many changes may be made therein without departing from the spirit of the same, and especially as to quantities, temperatures, time intervals, etc. It will be understood, also, that the seed crystals above referred to are of any of the forms of the dihydrostreptomycin contemplated herein and that they may be of any desired size.

I claim:

1. A process for treating dihydrostreptomycin sulfate which comprises forming an aqueous solution of said sulfate, adding methanol to said solution in such an amount that the methanol content of the resulting liquid is about 50% by volume, the dihydrostreptomycin sulfate content of said resulting liquid being about 15% by weight, introducing seed crystals into said liquid, allowing said liquid to stand and thereafter adding additional methanol in three equal increments at intervals until the total methanol content is approximately 80% by volume, each of said increments having a volume equal to approximately the initial methanol content of the liquid, allowing separate methanol-predominant and aqueous-predominant layers to form, crystallizing said dihydrostreptomycin sulfate from said aqueous-predominant layer, and separating the resulting crystals from the liquid associated therewith.

2. A process for treating dihydrostreptomycin sulfate which comprises forming an aqueous solution of said sulfate, adding methanol to said solution in such an amount that the methanol content of the resulting liquid is 45 to 60% by volume, the dihydrostreptomycin sulfate content of said resulting liquid being about 15% by weight, introducing seed crystals into said liquid, allowing said liquid to stand and thereafter adding additional methanol in three equal increments at intervals until the total methanol content is approximately 80% by volume, allowing separate methanol-predominant and aqueous-predominant layers to form, crystallizing said dihydrostreptomycin sulfate from said aqueous-predominant layer, and separating the resulting crystals from the liquid associated therewith.

3. A process for treating dihydrostreptomycin sulfate which comprises forming an aqueous solution of said sulfate, adding methanol to said solution in such an amount that the methanol content of the resulting liquid is 45 to 60% by volume, the dihydrostreptomycin sulfate content of said resulting liquid being about 15% by weight, introducing seed crystals into said liquid, allowing said liquid to stand and thereafter adding additional methanol in three equal increments at intervals until the total methanol content is approximately 80% by volume, allowing separate methanol-predominant and aqueous-predominant layers to form, crystallizing said dihydrostreptomycin sulfate from said aqueous-predominant layer, separating the resulting crystals from the liquid associated therewith, and during said crystallization maintaining the temperature of said liquid at approximately 50° C.

ROBERT B. PEET.

References Cited in the file of this patent

UNITED STATES PATENTS

| Number | Name | Date |
|---|---|---|
| 2,446,102 | Peck | July 27, 1948 |
| 2,498,574 | Peck | Feb. 21, 1950 |

OTHER REFERENCES

Carter et al., J. Biol. Chem., v. 160 (1945), p. 339.

Heuser et al., JACS, v. 70 (1948), p. 2833.

Science, v. 109 (1949), pp. 515–516.